US010412879B2

(12) United States Patent  
Cruson

(10) Patent No.: US 10,412,879 B2  
(45) Date of Patent: Sep. 17, 2019

(54) DECELERATING DEVICE FOR AIR CONVEYED MATERIAL

(71) Applicant: Tread Enterprises Ltd., Abbotsford (CA)

(72) Inventor: Brian Cruson, Abbotsford (CA)

(73) Assignee: Tread Enterprises Ltd., Abbotsford (CA)

(*) Notice: Subject to any disclaimer, the term of this patent is extended or adjusted under 35 U.S.C. 154(b) by 0 days.

(21) Appl. No.: 15/785,668

(22) Filed: Oct. 17, 2017

(65) Prior Publication Data

US 2018/0124997 A1    May 10, 2018

Related U.S. Application Data

(60) Provisional application No. 62/419,087, filed on Nov. 8, 2016.

(51) Int. Cl.
| | |
|---|---|
| B65G 53/58 | (2006.01) |
| A01C 7/08 | (2006.01) |
| A01C 7/20 | (2006.01) |
| B65G 53/16 | (2006.01) |
| B65G 53/52 | (2006.01) |

(52) U.S. Cl.
CPC ............ *A01C 7/082* (2013.01); *A01C 7/20* (2013.01); *A01C 7/206* (2013.01); *B65G 53/58* (2013.01); *B65G 53/16* (2013.01); *B65G 53/52* (2013.01)

(58) Field of Classification Search
CPC ............................. B65G 53/58; B65G 51/20
USPC .............................................. 406/84
See application file for complete search history.

(56) References Cited

U.S. PATENT DOCUMENTS

| | | | | | |
|---|---|---|---|---|---|
| 1,360,160 | A | * | 11/1920 | Weaver ................. | B65G 53/32 251/145 |
| 2,897,005 | A | * | 7/1959 | Wiltse .................. | B65G 53/521 406/95 |
| 3,336,085 | A | * | 8/1967 | Strydom ............... | A24C 5/323 406/28 |
| 3,915,505 | A | * | 10/1975 | Beale ................... | B65G 53/58 406/100 |
| 3,964,639 | A | * | 6/1976 | Norris .................. | A01C 7/082 221/278 |
| 4,256,418 | A | * | 3/1981 | Stangl .................. | B65G 51/32 406/112 |

(Continued)

*Primary Examiner* — Joseph A Dillon, Jr.  
(74) *Attorney, Agent, or Firm* — Ryan W. Dupuis; Ade + Company Inc.; Kyle R. Satterthwaite

(57) ABSTRACT

A decelerating device is mounted in series within a pneumatic particulate material delivery passage that communicates from a particulate material supply to a material outlet of a furrow opener for depositing particulate material into a furrow formed by the furrow opener. The decelerating device has a duct member extending longitudinally between opposing open ends for connection in line with the pneumatic particulate material delivery passage. A plurality of exhaust openings communicating through a peripheral wall of the duct member to exhaust air therethrough. A gate member is supported on the duct member so as to be movable relative to the exhaust openings to vary a cumulative exposed area of the exhaust openings. A perforated screen member spans across the exhaust openings having a smaller aperture size than the exhaust openings to ensure small particulate materials being conveyed do not escape through the exhaust openings.

12 Claims, 3 Drawing Sheets

(56) References Cited

U.S. PATENT DOCUMENTS

| | | | | |
|---|---|---|---|---|
| 4,493,273 | A * | 1/1985 | Gauchet | A01C 7/081 111/154 |
| 4,960,350 | A * | 10/1990 | Tsubata | B65G 51/02 406/83 |
| 5,299,891 | A * | 4/1994 | Grosswiller | B65G 51/34 406/112 |
| 5,328,301 | A * | 7/1994 | Oirschot | B65G 53/58 406/171 |
| 5,562,366 | A * | 10/1996 | Paulson | B65G 53/525 406/12 |
| 5,605,174 | A * | 2/1997 | Schlecht | B65G 53/523 137/13 |
| 6,591,534 | B1 * | 7/2003 | Trudeau | F41A 21/482 42/75.02 |
| 6,877,933 | B2 * | 4/2005 | Ho | B29C 31/02 406/152 |
| 7,509,915 | B2 * | 3/2009 | Memory | A01C 7/082 111/174 |
| 8,011,862 | B2 * | 9/2011 | Scott | B65G 51/34 406/110 |
| 9,155,243 | B2 * | 10/2015 | Heintzman | A01C 7/082 |
| 2002/0144637 | A1 * | 10/2002 | Wendling | A01C 7/042 111/163 |
| 2004/0037658 | A1 * | 2/2004 | Pfeiffer | B65G 53/18 406/194 |
| 2005/0201199 | A1 * | 9/2005 | O'Callaghan | B01F 3/18 366/141 |
| 2012/0107059 | A1 * | 5/2012 | Howland | B65G 53/24 406/84 |
| 2018/0029808 | A1 * | 2/2018 | Sorensen | B65G 51/02 |

* cited by examiner

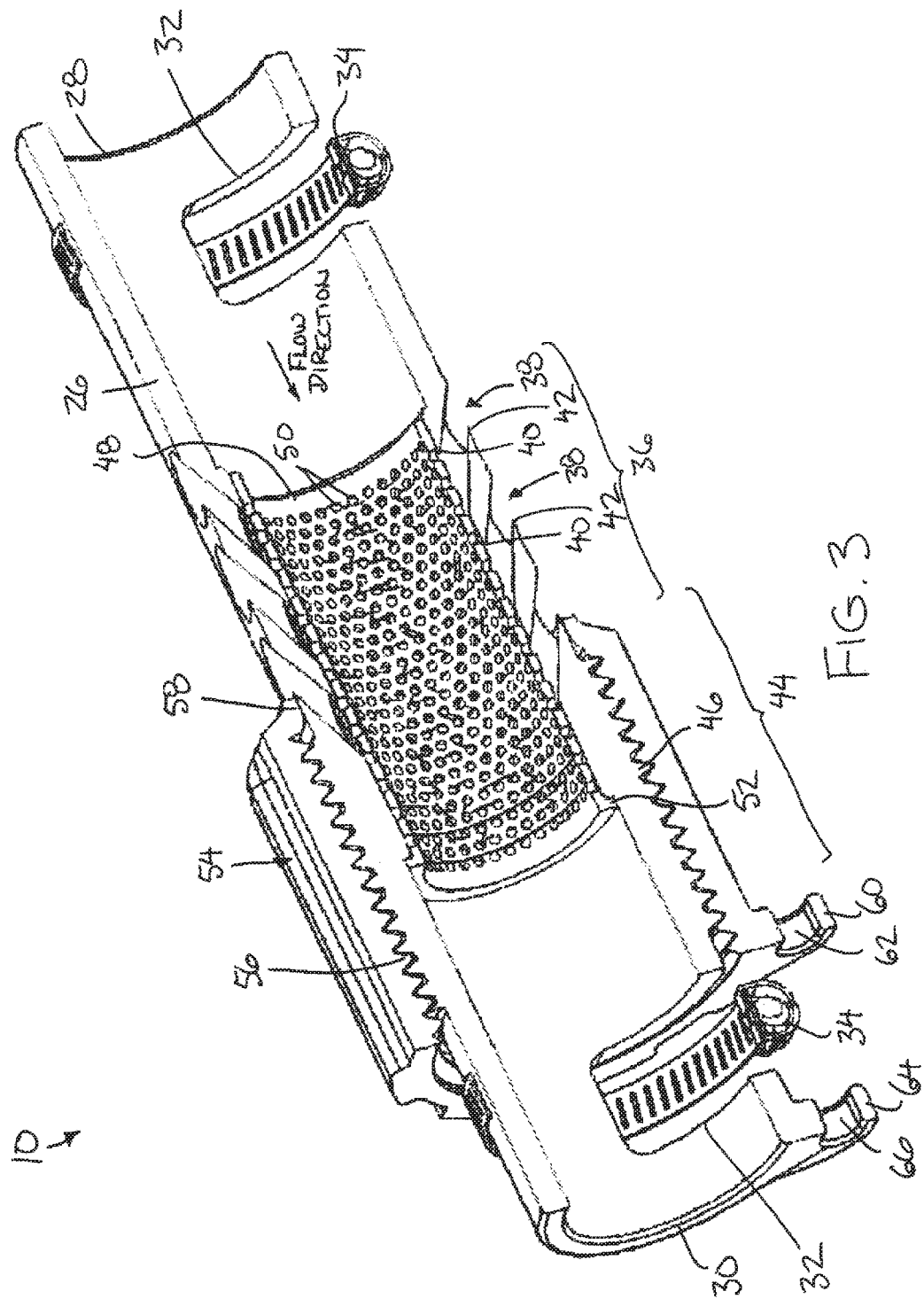

DECELERATING DEVICE FOR AIR CONVEYED MATERIAL

This application claims the benefit under 35 U.S.C. 119(e) of U.S. provisional application Ser. No. 62/419,087, filed Nov. 8, 2017.

FIELD OF THE INVENTION

The present invention relates to a material decelerating device for use in an agricultural air distribution system which pneumatically conveys particulate material, for example seed and fertilizer, through distribution tubes. More particularly the present invention relates to a material decelerating device, which cart be connected between a distribution tube of the air distribution system and a material outlet on a furrow opener for at least partially exhausting the conveying air through a diffuser opening in the device separate from the particulate material deposited into the material outlet.

BACKGROUND

In agriculture, it is common to make use of air distributions systems for delivery of seed or fertilizer to furrows formed in the ground by respective furrow openers of a suitable implement. As the force of air exiting distribution tubes of the air distribution system can inadvertently cause the material being distributed to be blown out of the furrow, the use of the various types of material decelerating devices are known.

Two examples of material decelerating devices are described in U.S. Pat. No. 7,509,915 by Memory and U.S. Pat. No. 4,493,273 by Gauchet et al and in US Patent Application Publication 2002/0144637 by Wendling et al. In each instance, a cyclonic separator is used to separate the material being conveyed from the conveying air stream. Using the designs of the prior art however, lighter materials can be caught in the conical air flow and inadvertently exhausted out of the upper air vent instead of the product delivery opening at the bottom end. In other instances, the material being conveyed may be trapped within the cyclonic flow of air within the separator.

U.S. Pat. No. 9,155,243 by Heintzman, U.S. Pat. No. 6,591,534 by Meyer, and U.S. Pat. No. 3,964,639 by Norris et al disclose examples of material decelerating devices for an air drill in the form of a perforated tube section for mounting in line with a pneumatic seed delivery line permitting air to be exhausted radially therefrom. None of the devices provide any feasible means of readily adjusting the size of the exhaust openings to control the amount of air being exhausted such that the device is not well suited to applications where it is desirable to exhaust different amounts of air flow from different delivery tubes having varying air flow rates therein throughout a pneumatic delivery system.

SUMMARY OF THE INVENTION

According to one aspect of the invention there is provided a decelerating device for use with a pneumatic particulate material delivery passage communicating from a particulate material supply to a material outlet of a furrow opener for depositing particulate material into a furrow formed by the furrow opener, the decelerating device comprising:

a duct member extending longitudinally between opposing open ends and arranged for connection in series with the pneumatic particulate material delivery passage;

a plurality of exhaust openings communicating through a peripheral wall of the duct member; and a gate member supported on the duct member so as to be movable relative to the exhaust openings to vary a cumulative exposed area of the exhaust openings.

The use of a duct member having a gate member to vary the amount of exhaust opening area which is opened for exhausting air therethrough enables a plurality of decelerating devices to be installed in respective pneumatic delivery lines of an overall system in which some relative adjustment of the air being exhausted from different delivery lines can be adjusted. This prevents exhausting too much air from some delivery lines having a negative effect on the flow rate for carrying particulate material through other delivery lines as can occur in the prior art systems where no relative adjustment is provided between different product delivery lines locating decelerating devices therein.

In the illustrated embodiment, the gate member is movable between a fully open position in which all of the exhaust openings are open and exposed for exhausting air therethrough and a fully closed position in which all of the exhaust openings are closed to prevent air being exhausted therethrough.

The gate member preferably comprises a collar supported externally about the duct member in which the gate member is threadably connected to the duct member so as to vary the cumulative exposed area of the exhaust openings by rotation of the gate member relative to the duct member to displace the gate member longitudinally along the duct member.

There may further be provided a locking device arranged to selectively restrict rotation of the gate member relative to the duct member at a selected exposed area of the exhaust openings. The locking device may comprise a locking aperture on the gate member arranged for selective alignment with a corresponding locking aperture on the duct member for receiving a locking member through both locking apertures to selectively restrict rotation of the gate member relative to the duct member.

In the illustrated embodiment, each exhaust opening extends through a peripheral wall of the duct member from an inner surface to an outer surface of the duct member in a radial direction at a longitudinal slope opposite to a flow direction through the duct member.

According to a second aspect of the present invention there is provided a decelerating device for use with a pneumatic particulate material delivery passage communicating from a particulate material supply to a material outlet of a furrow opener for depositing particulate material into a furrow formed by the furrow opener, the decelerating device comprising:

a duct member extending longitudinally between opposing open ends and arranged for connection in series with the pneumatic particulate material delivery passage;

a plurality of exhaust openings communicating through a peripheral wall of the duct member; and a perforated screen member spanning across the exhaust openings and having a plurality of screen apertures therein which are smaller in size than the exhaust openings such that a plurality of screen apertures are associated with each exhaust opening.

Preferably the screen member is supported at an inner surface of the duct member by being inserted into the duct member and retained therein by an interference fit between the screen member and the duct member.

Preferably the decelerating device is provided with a plurality of perforated screen members each having a plurality of screen apertures therein which are different in size from other ones of the perforated screen members, such that the perforated screen members are interchangeable with one another relative to the duct member.

BRIEF DESCRIPTION OF THE DRAWINGS

One embodiment of the invention will now be described in conjunction with the accompanying drawings in which:

FIG. 3 is a partly sectional perspective view of the decelerating device intersected along a longitudinally oriented plane.

In the drawings like characters of reference indicate corresponding parts in the different figures.

DETAILED DESCRIPTION

Figure 1:
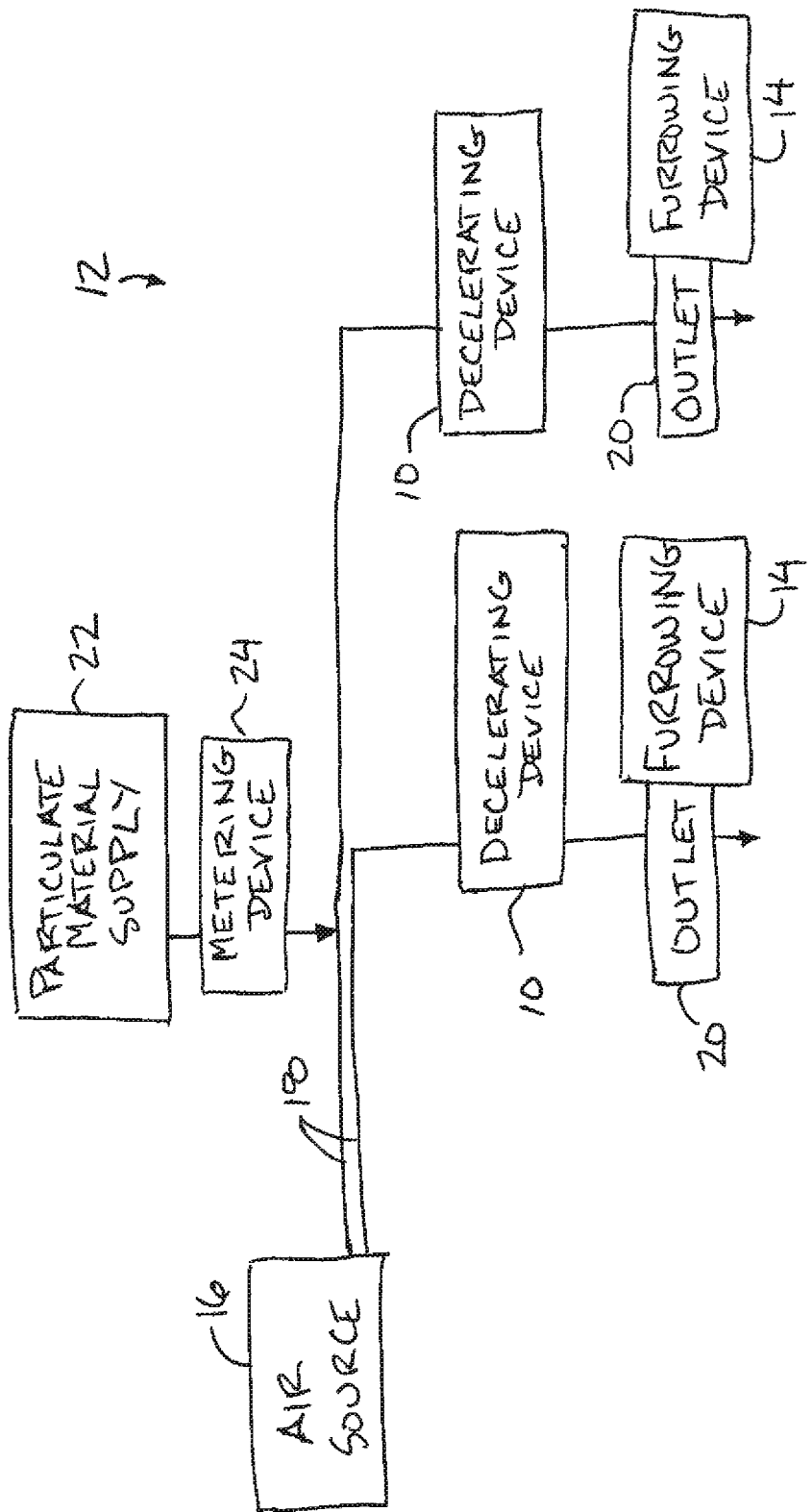
FIG. 1 is a schematic representation of an agricultural seeding implement incorporating a plurality of the decelerating devices 10 therein.
Figure 2:
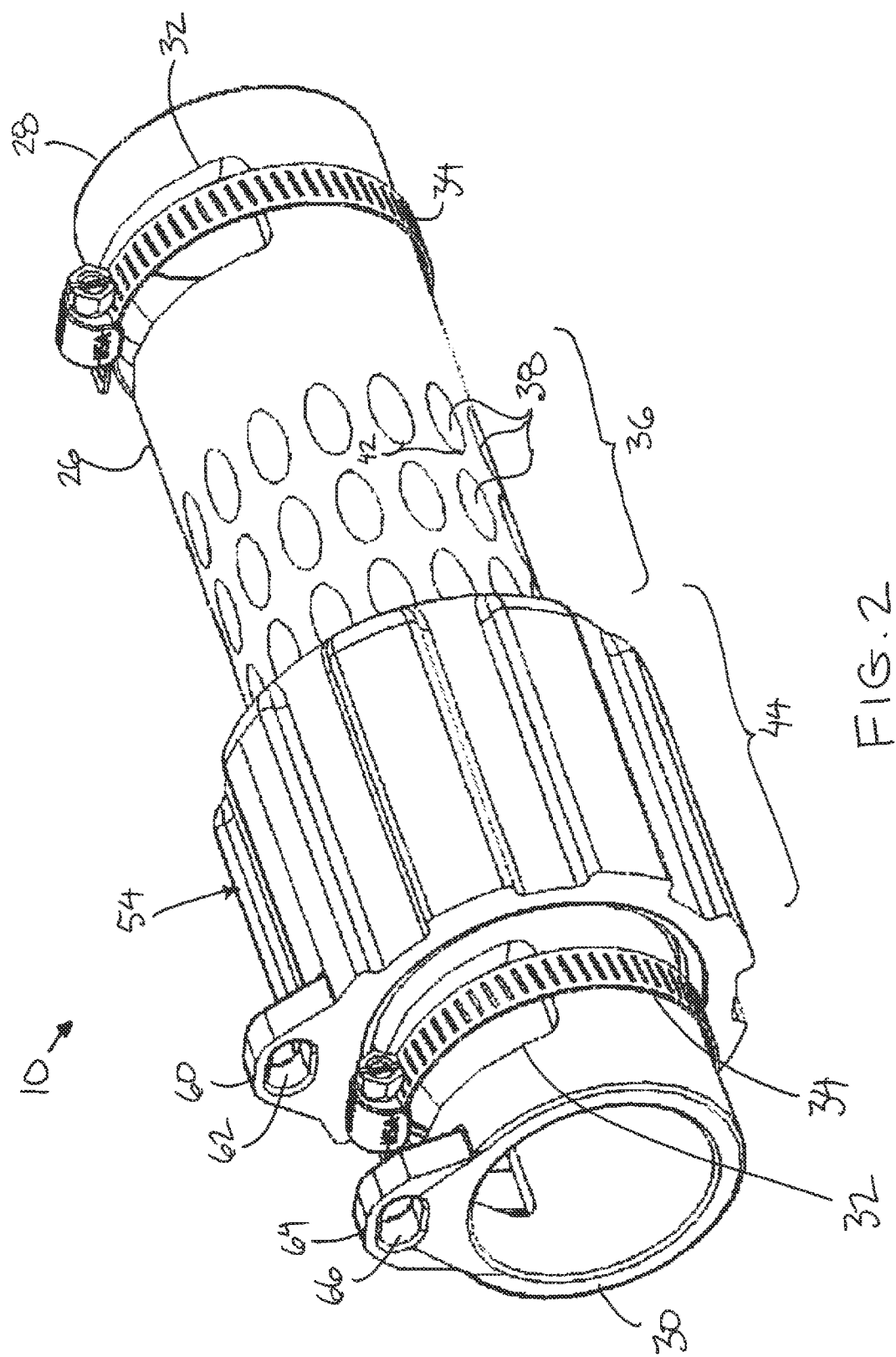
FIG. 2 is a perspective view of the decelerating device.

Referring to the accompanying figures there is illustrated a decelerating device generally indicated by reference numeral 10.

The device 10 is particularly suited for use with an agricultural air seeding implement 12. A typical seeding implement 12 includes a plurality of furrowing devices 14 supported on a frame to be towed across the ground for forming respective furrows in the ground. A pneumatic delivery system includes a pressurized air source 16, such as a blower fan, which directs a flow of air through a plurality of pneumatic delivery lines 18 which communicate with respective material outlets 20 of the furrowing devices 14 respectively. A particulate material supply 22, for example a seed tank, is also supported on the frame of the implement 12 for delivering particular material into the pneumatic delivery lines 18 using a metering device 24. Each pneumatic delivery line 18 thus receives particulate material which is metered into the pressurized air flow directed therethrough for conveying the particulate material to the material outlet of the furrowing devices and to deposit the particulate material into the furrows. The pneumatic delivery lines 18 include a series of tubes defining a delivery passage therethrough through which the seed is conveyed pneumatically.

The decelerating device 10 generally includes a duct member 26 in the form of an elongate rigid tube extending in a longitudinal direction between an inlet end 28 and an opposing outlet end 30. The duct member 26 has an inner diameter which corresponds approximately to the outer diameter of a respective tube of the pneumatic delivery lines such that the duct member can be mounted in series between corresponding sections of the delivery tube by inserting the end of each delivery tube section into a respective one of the open ends of the duct member. The duct member 26 is oriented to receive the air flow from the delivery tube in a flow direction therethrough from the inlet end to the outlet end respectively.

In order to couple the opposing ends of the duct member to the respective tube sections, a slot 32 is formed in the outer wall in proximity to each end of the duct member which communicates fully through the duct member from the exterior to the interior thereof. The slot is elongate in a circumferential direction to extend only partway about the circumference of the duct member while having a width in the longitudinal or axial direction which is slightly greater than a corresponding strap 34 used to fix the position of the delivery tube sections relative to opposing ends of the duct member. Each strap comprises a circumferential clamp which is arranged to be constricted about the outer diameter of the duct member in alignment with a respective one of the circumferential slots 32 subsequent to insertion of the delivery tube sections in to the ends of the duct member sufficiently to communicate with the circumferential slot. Tightening each strap 34 effectively allows the strap to be received in the respective circumferential slot for clamping the respective delivery tube section against the inner surface of the duct member at a location diametrically opposite from the circumferential slot.

The duct member includes an exhaust section 36 located at an intermediate location between the circumferential slots at the opposing ends of the duct member. The exhaust section is defined by a plurality of exhaust openings 38 which communicate fully through the wall of the duct member from the inner surface to the outer surface thereof. The exhaust openings 38 are located in an array comprised of a plurality of evenly spaced rows of apertures spaced apart from one another in the axial direction in which a plurality of openings are provided within each row at evenly spaced apart positions in a circumferential direction about the full circumference of the duct member. In the illustrated embodiment, three rows of exhaust openings are provided in which approximately 15 exhaust openings are evenly spaced apart circumferentially relative to one another within each row.

Each exhaust opening extends radially outward from the inner surface to the outer surface of the duct member at a slope which is oriented towards the inlet end 28 of the duct member as the opening extends radially outward. The exhaust openings thus extend radially outward at a slope in the longitudinal direction opposite to the flow direction through the duct member. The thickness of the wall and the angle of the slope is such that a leading edge 40 of the opening in the flow direction at the inner surface of the duct member is situated approximately in alignment with or slightly downstream from a trailing edge 42 at the outer surface of the duct member of the same opening. In this manner, any flow of air exhausted from the duct member through the exhaust openings must be exhausted radially outward in an axially opposed orientation relative to the primary flow direction through the duct member.

The duct member 26 further includes a threaded section 44 which is located axially in series between the exhaust section and the outlet end 30 of the duct member. The threaded section 44 of the duct member is defined by a plurality of external threads 46 integrally formed on the outer surface of the tube forming the duct member.

The decelerating device 10 further includes a screen member 48 in the form of a tubular metal sleeve locating a plurality of screen apertures 50 therein. The screen apertures have respective diameters which are smaller than the diameters of the exhaust openings 38. The outer diameter of the tubular metal sleeve forming the screen member is approximately equal to the inner diameter of the duct member while the overall length in the axial direction of the screen member is slightly greater than the axial length of the exhaust section. In this manner when the screen member 48 is received within the exhaust section of the duct member, the perforated wall of the sleeve forming the screen member spans across the inner surface of each of the exhaust openings throughout the exhaust section.

In the illustrated embodiment, the outer diameter of the sleeve forming the screen member is slightly undersized relative to the inner diameter of the duct member throughout most of the length thereof to allow ready insertion into the duct member, however the trailing end of the screen member relative to the flow direction includes a protruding rim 52 protruding radially outward from the main portion of the screen member about the full circumference thereof so as to have an outer diameter which wedges within the interior diameter of the duct member by in interference fit. In this manner, the screen member can be readily inserted into the duct member under force to overcome the interference fit of the rim 52, however once the screen member is located in the desired location fully spanning the exhaust section, the interference fit of the rim 52 serves to sufficiently retain the screen member at the desired location.

In preferred embodiments, a plurality of screen members may be provided which are identical in size so as to be readily interchangeable within a common duct member 26. The different screen members are provided with different sized screen apertures 50 to be best suited for ensuring that the apertures are sufficiently small to restrict the exhausting of particulate material therethrough while being sufficiently large so as to ensure sufficient air is exhausted through the exhaust openings to adequately decelerate the particular material being conveyed. Depending upon the different particulate material being conveyed, the operator can select an appropriate screen member having an appropriate size of apertures 50 to ensure optimal performance.

The decelerating device 10 further comprises a gate member 54 in the form of a collar arranged to be mounted externally about the duct member 26. The gate member 54 is operable relative to the exhaust openings to selectively cover and uncover different portions of the array of exhaust openings to vary the cumulative exposed area of the exhaust openings which varies the amount of air exhausted from the decelerating device.

The collar includes an inner diameter which corresponds closely to the outer diameter of the duct member and is internally threaded with a series of threads 56 which mate with the external threads 46 on the duct member. The collar is thus movable axially or longitudinally relative to the duct member as it is rotated about the duct member. The overall length of the gate member 54 in the axial direction is greater than the length of the exhaust section so as to enable the gate member to be movable axially between a fully closed position in which the collar fully spans across all of the exhaust openings to fully close all exhaust openings, and a fully open position in which all of the exhaust openings are fully exposed so as to be open to exhaust air therefrom.

The leading end of the collar forming the gate member includes an inner rim 58 thereon which protrudes radially inwardly about the full circumference of the collar in close engagement with the outer diameter of the duct member so as to substantially provide a sealing engagement between the leading edge of the collar and the outer diameter of the duct member throughout adjustment of the gate member along the duct member.

The gate member can be set in position relative to the duct member at either one of the fully open or fully closed positions as well as numerous intermediate positions therebetween of varying degrees of exposure of the exhaust openings. A locking feature is provided to secure the gate member relative to the duct member at a selected position.

The locking feature includes a first tab 60 protruding radially outward from the downstream or outlet end of the collar forming the gate member which locates an eyelet opening 62 therein. The locking feature also includes a second tab 64 protruding radially outward from the outer surface of the duct member in proximity to the outlet end 30 thereof. The second tab 64 includes a corresponding eyelet opening 66 therein. Once the gate member is located at a preferred setting relative to the duct member, the first and second tabs are aligned to protrude in the same radial direction from a central longitudinal axis of the duct member and a suitable locking member is used to communicate through the two eyelet openings 62 and 66 to lock the position of the collar of the gate member relative to the duct member. A suitable locking member may include a pin, or a tie, for example a self-locking plastic tie member, commonly referred to as a zip-tie, having a locking clasp at one end and an opposing free end which can be inserted through both openings and then clasp to be retained in a loop.

In further embodiments, the locking feature may comprise a set screw threaded radially through the body of the gate member for selectively engaging the duct member, or a locking nut secured about the external threads of the duct member which can be snugly tightened against one end of the gate member for example.

The duct member 26 of the decelerating device 10 is preferably moulded as a single, unitary, seamless body of plastic material including the exhaust openings and the external threads 46 formed integrally thereon, as well as the second tab 64 of the locking feature. Similarly, the gate member is preferably moulded as a single, unitary, seamless body of plastic material including the first tab 60 of the locking feature and the internal threads 56 formed integrally thereon. The screen member 48 is formed as a single, unitary, seamless metal tube so as to have a thinner wall than the tube of the duct member while also being more rigid to be suited for interference fit within the surrounding more resilient duct member.

In use, the decelerating device 10 is mounted in series within one of the pneumatic delivery lines 18 by cutting the delivery line to form two delivery tube sections having respective ends which can be inserted into the opposing ends of the duct member and clamped therein using the straps 34 within the circumferential slots 32. Prior to installation within the selected pneumatic delivery line, a screen member is selected having an appropriate size of perforated aperture therein which is smaller than the particulate material being delivered by the pneumatic line. Once installed, the collar of the gate member can be adjusted in position along the length of the duct member by rotating the threads of the gate member relative to the threads of the duct member to vary the cumulative exposed area of the exhaust openings which controls the volume of air permitted to be exhausted through the exhaust openings.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A decelerating device for use with a pneumatic particulate material delivery passage communicating from a particulate material supply to a material outlet of a furrow opener for depositing particulate material into a furrow formed by the furrow opener, the decelerating device comprising:

a duct member extending longitudinally between opposing open ends and arranged for connection in series with the pneumatic particulate material delivery passage;

a plurality of exhaust openings communicating through a peripheral wall of the duct member; and a gate member supported on the duct member so as to be movable relative to the exhaust openings to vary a cumulative exposed area of the exhaust openings;

the gate member comprising a collar supported externally about the duct member by a threaded connection such that (i) the gate member is displaced longitudinally along the duct member as the gate member is rotated about the duct member and (ii) the cumulative exposed area of the exhaust openings varies as the gate member is displaced longitudinally along the duct member.

2. The device according to claim 1 wherein the gate member is movable between a fully open position in which all of the exhaust openings are open and exposed for exhausting air therethrough and a fully closed position in which all of the exhaust openings are closed to prevent air being exhausted therethrough.

3. The device according to claim 1 further comprising a locking device arranged to selectively restrict rotation of the gate member relative to the duct member at a selected exposed area of the exhaust openings.

4. The device according to claim 3 wherein the locking device comprises a locking aperture on the gate member arranged for selective alignment with a corresponding locking aperture on the duct member for receiving a locking member through both locking apertures to selectively restrict rotation of the gate member relative to the duct member.

5. The device according to claim 1 further comprising a perforated screen member spanning across the exhaust openings and having a plurality of screen apertures therein which are smaller in size than the exhaust openings such that a plurality of screen apertures are associated with each exhaust opening.

6. The device according to claim 5 wherein the screen member is supported at an inner surface of the duct member.

7. The device according to claim 5 wherein the screen member is inserted into the duct member and retained therein by an interference fit between the screen member and the duct member.

8. The device according to claim 5 further comprising a plurality of perforated screen members each having a plurality of screen apertures therein which are different in size from other ones of the perforated screen members, the perforated screen members being interchangeable with one another relative to the duct member.

9. The device according to claim 1 wherein each exhaust opening extends through a peripheral wall of the duct member from an inner surface to an outer surface of the duct member in a radial direction at a longitudinal slope opposite to a flow direction through the duct member.

10. A decelerating device for use with a pneumatic particulate material delivery passage communicating from a particulate material supply to a material outlet of a furrow opener for depositing particulate material into a furrow formed by the furrow opener, the decelerating device comprising:

a duct member extending longitudinally between opposing open ends and arranged for connection in series with the pneumatic particulate material delivery passage;

a plurality of exhaust openings communicating through a peripheral wall of the duct member;

a gate member is threadably connected to the duct member so as to vary the cumulative exposed area of the exhaust openings by rotation of the gate member relative to the duct member; and a locking device arranged to selectively restrict rotation of the gate member relative to the duct member at a selected exposed area of the exhaust openings;

the locking device comprising a locking aperture on the gate member arranged for selective alignment with a corresponding locking aperture on the duct member for receiving a locking member through both locking apertures to selectively restrict rotation of the gate member relative to the duct member.

11. A decelerating device for use with a pneumatic particulate material delivery passage communicating from a particulate material supply to a material outlet of a furrow opener for depositing particulate material into a furrow formed by the furrow opener, the decelerating device comprising:

a duct member extending longitudinally between opposing open ends and arranged for connection in series with the pneumatic particulate material delivery passage;

a plurality of exhaust openings communicating through a peripheral wall of the duct member; and a gate member supported on the duct member so as to be movable relative to the exhaust openings to vary a cumulative exposed area of the exhaust openings;

each exhaust opening extending through a peripheral wall of the duct member from an inner surface to an outer surface of the duct member in a radial direction at a longitudinal slope opposite to a flow direction through the duct member.

12. A decelerating device for use with a pneumatic particulate material delivery passage communicating from a particulate material supply to a material outlet of a furrow opener for depositing particulate material into a furrow formed by the furrow opener, the decelerating device comprising:

a duct member extending longitudinally between opposing open ends and arranged for connection in series with the pneumatic particulate material delivery passage;

a plurality of exhaust openings communicating through a peripheral wall of the duct member;

a gate member supported on the duct member so as to be movable relative to the exhaust openings to vary a cumulative exposed area of the exhaust openings;

a perforated screen member comprising:

(i) a sleeve spanning across the exhaust openings and having a plurality of screen apertures therein which are smaller in size than the exhaust openings such that a plurality of screen apertures are associated with each exhaust opening in which the sleeve having an outer diameter which is approximately equal to an inner diameter of the duct member at the exhaust openings; and (ii) a mounting portion having an outer diameter which is sized relative to an inner diameter of a corresponding portion of the duct member such that the mounting portion is wedged by interference fit into the corresponding portion of the duct member.

* * * * *